3,397,080
PROTECTIVE CERAMIC COATING
Roland T. Girard, Scotia, and Chester T. Sims, Ballston Lake, N.Y., and Harriet R. Wisely, Kennewick, Wash., assignors to General Electric Company, a corporation of New York
No Drawing. Filed Dec. 28, 1964, Ser. No. 421,629
11 Claims. (Cl. 117—129)

This invention relates to protective ceramic coatings for metals and more particularly to such coatings which protect the metallic substrate from oxidation or other undesirable chemical reaction at elevated temperatures, which act as a thermal insulator, and which have a coefficient of thermal expansion which is substantially identical to the metal substrate.

As is well known, many metals and alloys commonly used for structural purposes tend to react with their ambient atmospheres at a rate which rapidly increases as the ambient temperature is increased. For example, rapid oxidation of many iron-base alloys at elevated temperatures is a well-known problem which has been approached by substituting more expensive corrosion-resistant alloys for the more readily attacked materials. In some applications, however, the reactive atmosphere is not oxygen and, hence, the oxidation-resistant alloys may not be effective.

In many applications such as, for example, internally cooled gas turbine buckets or steam turbine nozzle boxes, a high thermal flux occurs causing undesirable internal stresses in the metal parts used because of their high thermal conductivity.

Further, in some applications, metal members may be exposed to thermal cycling conditions during which they may be briefly exposed to temperatures approaching or at times exceeding their melting points. Superficial fusion may take place with attendant undesirable results.

Yet further, in other applications, the heated metal member, being in a softened condition, may be exposed to attrition by the impact thereon of small hard particles carried by the ambient atmosphere.

In the past, attempts have been made to overcome these problems by the application of various nonmetallic coatings which would act as a protective shield against oxidation, as thermal barriers against high thermal fluxes, or as mechanical barriers against erosion. In particular, attempts have been made to apply thin layers of ceramic or glass-like materials to the exposed surfaces of such members. However, relatively few have proven effective, particularly where thermal cycling has occurred. Usually, these coatings have failed during repeated heating and cooling cycles because of the large differences between the coefficients of thermal expansion of the nonmetallic and metallic materials. In some cases, a single thermal cycle is sufficient to destroy the integrity of the composite body.

It is, therefore, a principal object of this invention to provide a protective coating for metal substrates which is adherent, has a coefficient of thermal expansion which is substantially identical to that of the metal substrate through the effective temperature range of operation, yet has other physical and mechanical properties characteristic of ceramics rather than of metals.

A further object of this invention is the provision of a protective coating for metallic substrates which provides an effective thermal barrier for the substrate.

A yet further object of this invention is the provision of a protective coacting for mettalic substrates which is effective in excluding reactive atmospheric gases or vapors from contact with the surface of the metal substrate.

Other and specifically different objects of the invention will become apparent from the following disclosure.

More specifically, it has been discovered that adherent protective ceramic coatings of lithium titanate, a refractory ceramic oxide, and also solid solutions of lithium titanate with other ceramic oxides may be applied to metallic substrates to form an integral composite body.

The coefficient of expansion of lithium titanate has been found to match that of or to vary only slightly from that of several important widely used metals and alloys, and further, the coefficient of thermal expansion of a coating material embodying lithium titanate may be adjusted to be substantially identical to the coefficient of thermal expansion of a wide variety of metallic substrates.

In order to better understand the invention, the following detailed description is provided. Lithium titanate may be prepared by mixing appropriate amounts of lithium carbonate ($Li_2CO_3$) and titanium dioxide ($TiO_2$) and firing at about 1250° C. in an air atmosphere to form $Li_2TiO_3$, with the evolution of carbon dioxide. The lithium titanate is preferably ground in a ball mill or pebble mill in a nonaqueous vehicle such as acetone, for example, for four to five hours, dried and compacted under 10,000 p.s.i. into three-inch diameter by one-inch thick pellets, fired at about 1200° C. for about ½ hour, crushed, and reground in a ball mill as set forth previously. This procedure may be repeated one or more times to insure complete reaction and a homogeneous product. After final ball milling and drying steps, the powdered product is screened to produce a controlled particle size. For the most effective use of the pulverulent ceramic in the flame spraying techique subsequently employed, a particle size distribution of from −150 to +200 mesh is desirable. Normally, the particulate lithium titanate is then applied to metal bodies or shapes by flame spraying to form a dense and uniform coating.

For example, utilizing a conventional oxy-acetylene powder spraying gun, an adherent coating of lithium titanate approximately 15 mils in thickness was applied to a disk of Udimet 500 alloy. This is a commercially available alloy having a nominal composition of about 18.5 percent chromium, 18.5 percent cobalt, 4 percent molybdenum, 3 percent titanium, 3 percent aluminum, 0.07 percent carbon, and the balance substantially all nickel. The so-coated disk was heated to 1700° F. in air and quenched by immersion in water so that cooling to room temperature occurred at a rate greater than 1000° F. per second. This heating and cooling cycle was repeated about ten times with no evidence of failure. Upon metallographic examination of the test specimen after the thermal cycling treatment, it appeared that the coating was still integrally bonded to the metal substrate.

Similarly, coated Udimet 500 specimens were cyclically heated to the range of 1000 to 1570° F. for about 16 cycles in propane and in diesel engine fuel as part of a gas turbine combustion chamber test. Again, no failure occurred and coating-to-substrate bond integrity was maintained. The coating showed no structural damage from oxidation.

As a thermal barrier, lithium titanate coatings with substantially no voids visible upon metallographic inspection up to 500X have thermal conductivity of about 5.5 B.t.u.-in./ft.$^2$-hr.-° F. at 300° F. compared to 6.0 B.t.u.-in./ft.$^2$-hr.-° F. for $ZrO_2$ (24 percent voids), and 117 B.t.u.-in./ft.$^2$-hr.-° F. for $Al_2O_3$ (6 percent voids) under the same conditions.

In the following table a comparison of the thermal expansion characteristics of lithium titanate with other ceramics and some metals and alloys is shown.

TABLE I.—NOMINAL PERCENT EXPANSION

| | (From 20° C. to X° C.) | | | | | | | |
|---|---|---|---|---|---|---|---|---|
| Material | 100 | 200 | 300 | 400 | 500 | 600 | 700 | 800 |
| MgO | 0.10 | 0.225 | 0.36 | 0.49 | 0.63 | 0.765 | 0.90 | 1.04 |
| $Li_2TiO_3$ | 0.11 | 0.26 | 0.43 | 0.60 | 0.80 | 1.0 | 1.2 | 1.4 |
| $Li_2MgTiO_4$ | 0.10 | 0.25 | 0.43 | 0.59 | 0.78 | 0.98 | 1.18 | 1.39 |
| $Al_2O_3$ | 0.03 | 0.11 | 0.185 | 0.26 | 0.345 | 0.435 | 0.53 | 0.63 |
| $ZrO_2$ | 0.05 | 0.13 | 0.24 | 0.35 | 0.46 | 0.57 | 0.68 | 0.79 |
| Iron | 0.10 | 0.23 | 0.375 | 0.525 | 0.68 | 0.84 | 0.995 | 1.14 |
| Iron Alloys: | | | | | | | | |
| AISI 304 | 0.14 | 0.315 | 0.50 | 0.69 | 0.88 | 1.08 | 1.29 | 1.50 |
| AISI 310 | 0.12 | 0.29 | 0.46 | 0.635 | 0.815 | 1.01 | 1.22 | 1.435 |
| AISI 347 | 0.135 | 0.20 | 0.475 | 0.675 | 0.88 | 1.095 | 1.315 | 1.555 |
| Nickel Alloys: | | | | | | | | |
| Ni-15Cr-3Al | 0.115 | 0.28 | 0.44 | | 0.765 | 0.93 | 1.095 | 1.26 |
| Ni-15Cr-16Mo | 0.095 | 0.22 | 0.355 | 0.49 | 0.64 | 0.80 | 0.965 | 1.125 |
| Ni-22Cr-18Fe | 0.11 | 0.245 | 0.405 | 0.56 | 0.715 | 0.885 | 1.065 | 1.245 |

It will be seen from the foregoing that both lithium titanate and lithium magnesium titanate exhibit expansion characteristics, particularly at temperatures above 300° C., which closely match many of the alloys. It will also be noted that while MgO is a much better match than either $Al_2O_3$ or $ZrO_2$, it still differs significantly from the metals at higher temperatures.

As discussed, it has been found that the thermal expansion properties of lithium titanate may be modified significantly where desired by incorporating other ceramic oxides such as, for example, MgO, which form solid solutions therewith. One such solid solution, $Li_2MgTiO_4$ (or $Li_2TiO_3 \cdot MgO$) is shown in Table I. The following table illustrates how the mean coefficient of thermal expansion of these materials may be varied.

TABLE II.—APPROXIMATE MEAN COEFFICIENT OF THERMAL EXPANSION ($\times 10^{-6}$/° C.)

| Material | 100–400° C. | 100–700° C. |
|---|---|---|
| $Li_2TiO_3$ | 17.8 | 18.9 |
| $0.75Li_2TiO_3 \cdot 0.25MgO$ | 18.2 | 19.0 |
| $0.50Li_2TiO_3 \cdot 0.50MgO$ | 16.9 | 18.4 |
| $0.25Li_2TiO_3 \cdot 0.75MgO$ | 15.4 | 16.6 |
| MgO | 12.6 | 13.4 |

These materials may be prepared by incorporation of appropriate amounts of $MgCO_3$ with $Li_2CO_3$ and $TiO_2$ and following the sintering and grinding procedure for unmodified lithium titanate set forth previously. Since the $MgO\text{-}Li_2TiO_3$ system is completely miscible, any amounts of the two materials may be combined permitting the "tailor-making" of coatings having an essentially exact match for any given thermal expansion characteristic within the limits of the system.

In addition to the foregoing compounds, mixtures of lithium titanate and other oxides in powder form have been applied as protective coatings to metal substrates by flame spraying techniques. For example, a mixture of 50 percent $Al_2O_3$ powder was thoroughly mixed with 50 percent by weight $Li_2TiO_3$ and flame sprayed upon an iron base alloy substrate to form an adherent continuous coating approximately 15 mils thick. A similar coating of 50 percent MgO, 50 percent $Li_2TiO_3$ was deposited upon another iron base alloy substrate. Since the temperatures and times involved were insufficient to permit any appreciable amount of diffusion between the particles, these coatings were two-phase in nature.

While for the purpose of making a more complete disclosure of the invention, specific examples of the coating composition and method of application have been illustrated, it will be appreciated that other materials may be substituted wholly or in part for the disclosed MgO and that other means of application may be employed. For example, such other oxides as FeO, NiO, CoO, and MnO form miscible systems with lithium titanate over the entire system range, and ZnO is miscible over a substantial portion of the system.

Furthermore, means other than flame spraying may be employed to produce a coating such as the plasma arc, dip coating, and sintering for example. Further, metallic titanium and lithium may be codeposited on a metallic substrate from the vapor phase and subsequently oxidized and sintered in place if desired. Other equivalent means of forming the desired coating will undoubtedly occur to those skilled in the art. For these reasons, it is not intended to limit the scope of this invention except as defined by the following claims.

What we claim as new and desire to secure by Letters Patent of the United States is:

1. A manufacture comprising a body of high temperature metal having a surface and a substantially continuous, applied coating layer bonded to said surface, the constitutents of said coating layer being selected from the group consisting of lithium titanate, and lithium titanate and an oxide selected from the group consisting of the oxides of magnesium, iron, nickel, cobalt, manganese, zinc and aluminum, wherein the weight percent of lithium titanate in said coating layer exceeds about 47 percent, and said coating layer having a coefficient of thermal expansion closely matching the coefficient of thermal expansion of said body of metal.

2. A manufacture as recited in claim 1, in which said ceramic coating layer has a thermal conductivity less than about 6 B.t.u.-in./ft.$^2$-hr./° F. at temperatures up to 1000° F.

3. A manufacture as recited in claim 1, in which said coating layer consists essentially of lithium titanate.

4. A manufacture as recited in claim 1, in which the constituents of said coating layer are in solid solution.

5. A manufacture as recited in claim 1, in which said coating layer consists essentially of a solid solution of lithium titanate and magnesium oxide.

6. A manufacture as recited in claim 1, in which said coating layer consists essentially of a solid solution of lithium titanate and iron oxide.

7. A manufacture as recited in claim 1, in which said coating layer consists essentially of a solid solution of lithium titanate and nickel oxide.

8. A manufacture as recited in claim 1, in which said coating layer consists essentially of a solid solution of lithium titanate and cobalt oxide.

9. A manufacture as recited in claim 1, in which said coating layer consists essentially of a solid solution of lithium titanate and manganese oxide.

10. A manufacture as recited in claim 1, in which said coating layer consists essentially of a solid solution of lithium titanate and zinc oxide.

11. A manufacture as recited in claim 1, in which the constituents of said coating layer are in two phases.

References Cited

UNITED STATES PATENTS

| | | | |
|---|---|---|---|
| 2,554,042 | 5/1951 | Mayfield et al. | 148—6.11 |
| 2,662,028 | 12/1953 | Fenton | 106—312 X |
| 2,827,393 | 3/1958 | Kadisch et al. | 117—129 X |
| 2,842,458 | 7/1958 | Feeney et al. | 117—70 |

ALFRED L. LEAVITT, *Primary Examiner.*

R. L. BROWDY, *Assistant Examiner.*